(12) United States Patent
Murthy et al.

(10) Patent No.: US 11,789,781 B1
(45) Date of Patent: Oct. 17, 2023

(54) LOAD GENERATION FOR BENCHMARKING

(71) Applicant: Amazon Technologies, Inc., Reno, NV (US)

(72) Inventors: Mahit Murthy, Bellevue, WA (US); John Barboza, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 116 days.

(21) Appl. No.: 17/487,669

(22) Filed: Sep. 28, 2021

(51) Int. Cl.
*G06F 9/50* (2006.01)
*G06N 20/00* (2019.01)

(52) U.S. Cl.
CPC ............. *G06F 9/505* (2013.01); *G06N 20/00* (2019.01)

(58) Field of Classification Search
CPC ................................. G06F 9/505; G06N 20/00
See application file for complete search history.

(56) References Cited

U.S. PATENT DOCUMENTS

| | | | |
|---|---|---|---|
| 2013/0185729 A1* | 7/2013 | Vasic | G06F 9/5072 718/104 |
| 2017/0006135 A1* | 1/2017 | Siebel | G06Q 10/06 |
| 2019/0312800 A1* | 10/2019 | Schibler | G06F 8/65 |
| 2020/0342068 A1* | 10/2020 | Cai | G06F 30/20 |
| 2021/0081836 A1* | 3/2021 | Polleri | G06F 18/2115 |

* cited by examiner

*Primary Examiner* — Raymond L Nimox
(74) *Attorney, Agent, or Firm* — Hogan Lovells US LLP

(57) ABSTRACT

Operating settings for a benchmarking operation may be determined, based at least in part, on one or more benchmarking task parameters. The operating settings may be used to establish a set of worker resources to send requests against a target until a stop condition is valid. Data may be collected from the target and used to train one or more machine learning systems in order to provide improved operating setting recommendations for subsequent benchmarking tasks.

20 Claims, 6 Drawing Sheets

LOAD GENERATION FOR BENCHMARKING

BACKGROUND

Users are increasingly using distributed systems in order to conduct various computing operations. In using these system, users often request benchmarking to determine how their provisioned services will behave under different scenarios. A provider may enable various tasks, such as load generation tasks, to perform benchmarking based on user configuration data, however, the process may be time consuming, especially when there are several different parameters that may be adjusted and tested.

BRIEF DESCRIPTION OF THE DRAWINGS

Various embodiments in accordance with the present disclosure will be described with reference to the drawings, in which.

DETAILED DESCRIPTION

Figure 1:
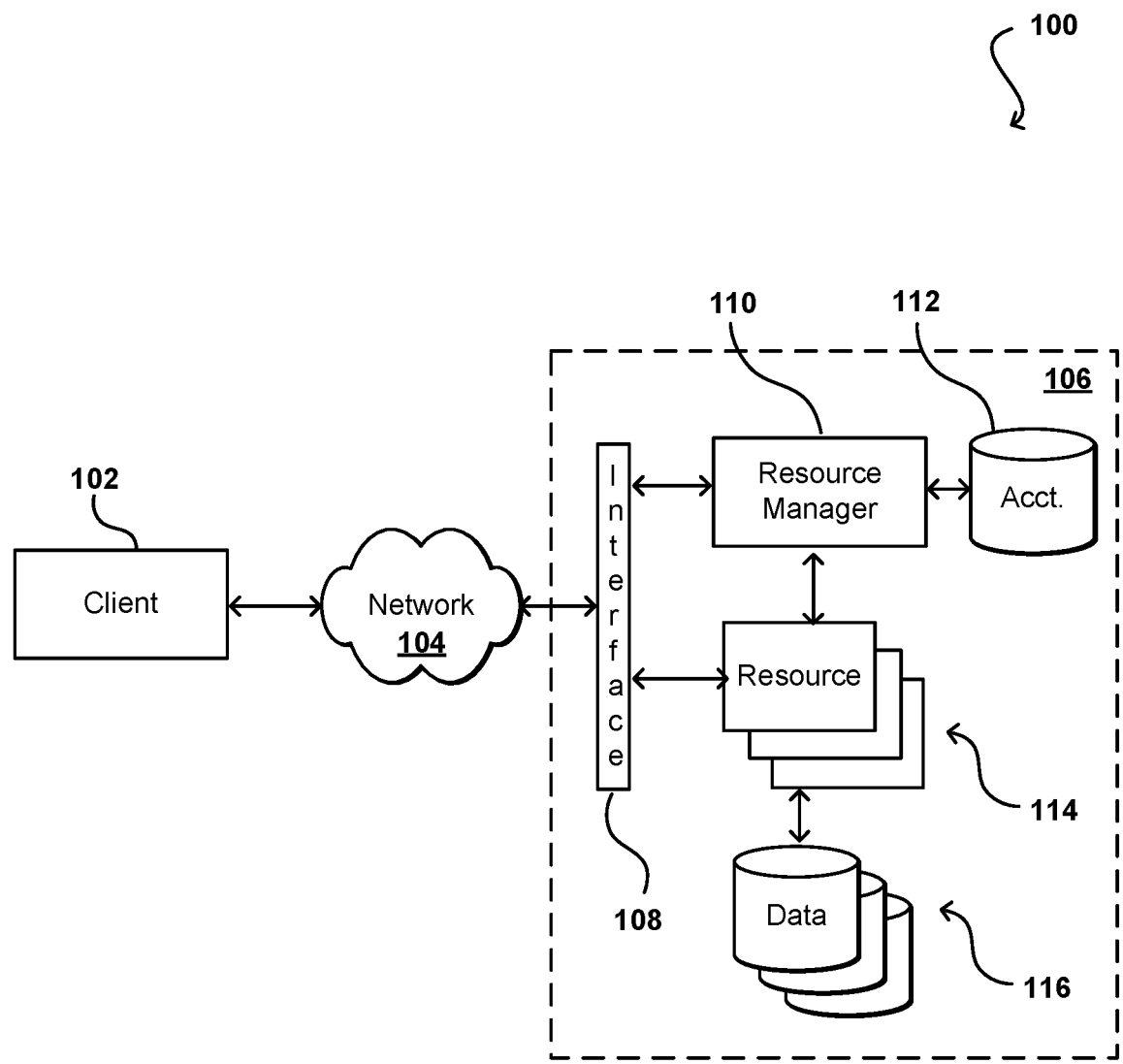
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to one or more systems or methods for load generation. Load generation may be a part of benchmarking (e.g., a benchmark task, a benchmarking task, a benchmark operation, a benchmarking operation), where different scenarios are generated for load-testing software for scalability, load-testing hardware, generating large datasets for modeling trainings and recommendations, and the like. In at least one embodiment, benchmarking may be deployed with various distributed services or hardware, such as those used by cloud providers.

Benchmarking may include applying a load to an endpoint using a particular configuration for different machines (e.g., computing resources) executing the loads. For example, the machines may be configured to operate as simulated users making requests to the endpoint, such as a service or inference request. During benchmarking, a set of configuration parameters are evaluated over time to determine a point where the endpoint is saturated (e.g., hits one or more predetermined limits). Thereafter, the system may be scaled or otherwise modified to evaluate different parameters or different limits. Over time, such benchmarking may provide information to users regarding when to scale their resource allocation, which types of hardware systems to select, and the like. Embodiments of the present disclosure are directed toward determining and suggesting different instances types and/or configurations for benchmarking requests. That is, systems and methods may utilize one or more machine learning systems to learn from past benchmark data and recommended one or more settings for a current or future benchmarking. In this manner, benchmarking may take less time, which may reduce costs for users and conserve resources. Furthermore, in various embodiments, benchmarking may be eliminated for certain configurations that substantially conform to or may be associated with previously benchmarked configurations.

Various embodiments may be directed toward one or more services that provide benchmarking, which may be provided along with a distributed environment, such as a resource or cloud environment. In at least one embodiment, a user interface, such as through an Application Programming Interface (API) or user experience (UX) may be provided for a user to enter different parameters, which may include the system to be load-tested, workload traffic patterns (e.g., linear slope, incremental step, sinusoidal, random, etc.), lists of stop conditions (e.g., halt conditions), and the like. This information may then cause the system to initialize an endpoint and establish one or more workers (e.g., computing resources), which may be within a serverless or server-based environment, to submit requests to the endpoint. In at least one embodiment, a monitoring or control entity may control or otherwise monitor health of the workers and receive information. The control entity may also scale the workers based, at least in part, on worker resource utilization metrics. Over time, sufficient requests may saturate the endpoint (e.g., achieve one or more stop conditions), and this information may be provided to a benchmark learning system. The benchmark learning system may include one or more machine learning systems to learn from past benchmarks and recommend settings for current or future benchmarks. In at least one embodiment, past resource utilization data is used to recommended settings (e.g., a number and size of workers) based, at least in part, on the learned information. The benchmark learning system may use a variety of different learning techniques, such as reinforcement learning, and may receive information as benchmarks are completed to update future recommendations. Furthermore, it should be appreciated that the benchmark learning system may include a multi-objective search where different parameters for benchmarking tasks are evaluated, recommended, and optimized. A monitoring system may collect and monitor the endpoints performance metrics and the benchmarking system's utilization metrics. Performance metrics may be collected in real or near-real time, may be provided upon completion of the benchmarking task, may be provided by request, may be provided at established intervals, or combinations thereof. It should be appreciated that various types of data and information may be collected and monitored, including but not limited to, latency, trusted platform module (TPM) on the endpoint, CPU utilization, GPU utilization, memory utilization, network utilization, and the like. Moreover, it should be appreciated that user-side metrics associated with the workers may also be monitored, which may include but is not limited to, container or instance CPU/memory utilization, cluster network utilization, and the like.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
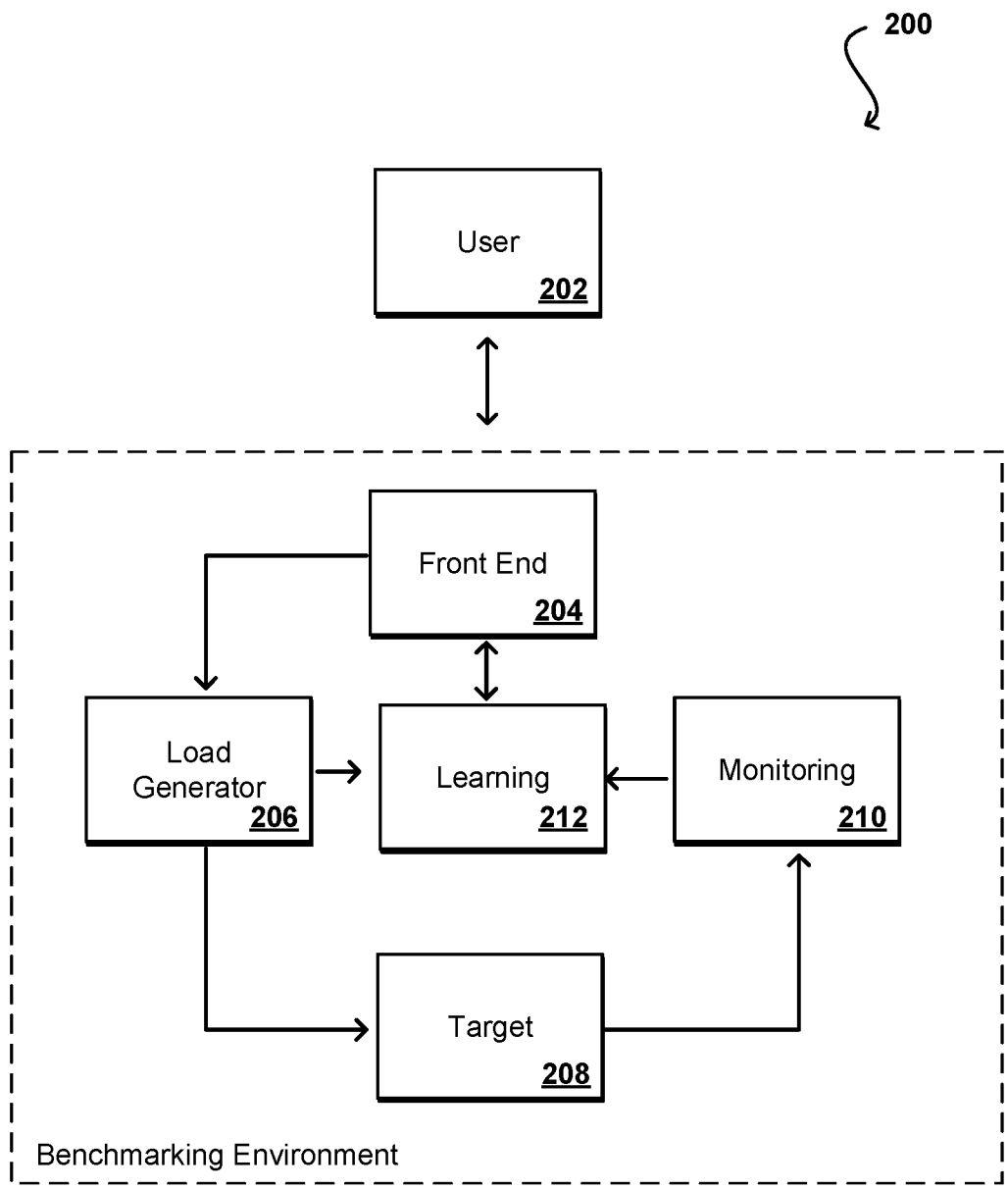
FIG. 2 illustrates an example environment for performing benchmarking that can be utilized in accordance with various embodiments.

FIG. 2 illustrates an example environment 200 that can be used to implement aspects of the various embodiments. In this example, a user 202 can submit a request to begin one or more benchmarking jobs (e.g., benchmark tasks, benchmark operations, benchmarking tasks, benchmarking operations, benchmarking processes, etc.), which may be associated with systems that the user 202 may host or otherwise utilize through one or more resource provider environments associated with a provider. The user 202 may be presented with a front end 204, such as an API and/or UX, in order to provide one or more user parameters for associated jobs. By way of example, the user 202 may upload a data file and/or provide a link access to a repository including a data file, where the data file may include one or more parameters associated with the system to be load-tested, the workload traffic patterns, a list of stop conditions, and the like. In at least one embodiment, the user 202 may provide artifacts (e.g., model artifacts) for model deployment. That is, the user 202 may bring their own machine learning models for testing. For example, the user 202 may develop models that will be hosted by or otherwise associated with one or more resources provided by the provider environment. As a result, the user 202 may desire to know how the models will operate or function within the deployment and, consequently, how to provision or otherwise request resources to ensure operational levels are maintained. It should be appreciated that, in various embodiments, the user 202 may be associated with a third-party user, such as a client or customer of the provider environment. However, in one or more embodiments, the user may be the provider itself, where artifacts are provided to test internal models. Accordingly, while embodiments may be described from a perspective of a user providing information for testing, a provider environment may utilize systems and methods to test in-house developed or used models, among other applications. Moreover, while model artifacts are provided as an example, it should be appreciated that load testing and benchmarking may be utilized in a variety of different applications for different services and hardware configurations.

In this example, the load generator 206 may provision or otherwise initiate one or more resources for the benchmarking operation. By way of example, the load generator 206 may initialize sever-based resources, serverless resources, or combinations thereof in order to begin testing. The load generator 206 may include a variety of difference resources, where one or more are designed as a control resource. The control resource may monitor and regulate operation of one or more worker resources. The worker resources are configured to execute one or more operations or tasks on a target 208, in an attempt to saturate or otherwise overwhelm the target 208 such that one or more stop conditions are met.

In at least one embodiment, the control resource and/or the worker resources may include tunable or individually configurable implementations, such as different CPU/GPU capabilities, memories, power consumption limits, and the like. Moreover, a portion of the resources may be sever-based resources while another portion may be serverless resources. Additionally, in at least one embodiment, a portion of the resources may correspond to resources within a dedicated allotment while another portion may correspond to resources within an on-demand allotment, and as a result, the resources may have different price points.

The control resource may monitor operation of the one or more worker resources, for example by information gathered via a monitoring subsystem 210 and/or via tools associated with the control resource. In this example, the monitoring subsystem 210 may further gather information from the target 208. Information may be associated with performance metrics of the target 208, utilization metrics, and the like. As non-limiting examples, the monitoring subsystem 210 may gather information associated with target system metrics including latency of individual requests, TPM on the target instance, CPU utilization, GPU utilization, memory utilization, network utilization, and the like. Moreover, the monitoring subsystem 210 may further gather information associated with client-side metrics including container CPU/Memory utilization, cluster network utilization, and the like. It should be appreciated that information may also be processed by the monitoring subsystem 210, for example, weighted averages may be deployed to smooth out outliers and produce reliable results. The monitoring system 210 may rather information in real or near-real time (e.g., without significant delay). Additionally, the monitoring system 210 may submit requests for information or may receive information at predetermined intervals. Furthermore, in various embodiments, the monitoring system 210 may receive information upon completion of the benchmarking task. It should be appreciated that combinations of requests, streaming information, and scheduled data transmission may be utilized in order to enable efficient gathering of information by the monitoring system 210.

In operation, the user 202 submits a request and associated information to run a benchmarking operation. The load generator 206 may establish the control resource and one or more worker resources, which may be executed in either a serverless containerized environment or a server-based environment. The control source may "spin up" or otherwise start worker resources, and may monitor their health and collect metrics and responses from the worker resources. In at least one embodiment, worker resources may be configured such that each worker can send a predetermined or maximum number of requests to the target 208. As an example, each worker resource may be modeled as an equivalent of 10 users, and each container may include a number of worker resources. These requests may be transmitted to the target 208, where one or more stop conditions are monitored. Initially, if the number of worker resources is low and/or the capabilities of the target 208 are sufficient, the number of worker resources may be insufficient to saturate the target 208. As a result, the control resource may initialize additional resources, which may send more requests. In at least one embodiment, the control resource auto scales worker resources based on the worker resource utilization metrics that it receives from the monitoring subsystem 210. The control resource may also periodically check stop conditions and stop whenever one of the conditions are reached. For example, a maximum latency may be associated with a stop condition that corresponds to saturation of the target 208. Furthermore, the control resource may break down the whole run into phases, where each phase has a particular traffic pattern, in order to identify operational conditions that may cause target saturation.

Once benchmarking is completed, or at another time such as intermediate increments or upon request, the metrics for both the target 208 and the load generator 206 are sent to a learning subsystem 212. In various embodiments, the learning subsystem 212 includes one or more machine learning systems that may be trained using previous benchmarking data in order to determine one or more settings for different benchmarking processes. By way of example, different input settings (e.g., desired latency, resource configuration, etc.) may be utilized, at least in part, to recommend different settings for the load generation procedure, such as a number and size of worker resources to start the benchmarking. As a result, the time for benchmarking may be reduced because rather than beginning with a small number of and/or size of worker resources, the output settings from the learning subsystem 212 may recommend a number and size of worker resources closer to a level to saturate the target 208. In this manner, fewer resources may be used over a shorter period of time for the benchmarking. This shorter time may reduce a cost to the user, which may pay for the time to host the target 208 and/or the load generator 206. In at least one embodiment, the learning subsystem 212 may provide recommendations prior to execution of the benchmarking task, such as upon receipt of instructions and/or upon receipt of the one or more parameters of the task. This information may be transmitted to the user 202 and/or directly to the load generator 206 to establish the control entity and various worker resources.

In at least one embodiment, the front end 204 may enable the user 202 to submit requests for benchmarking parameters, where the learning system 212 may provide recommended settings, which may be based, at least in part, on previous benchmarking information used to train one or more machine learning system. Benchmarking tasks may include multiple different tunable parameters and changes or modifications to one parameter may affect associated parameters. In various embodiments, the learning system 212 may utilize multi-objective optimization in order to optimize a time to reach saturation for the target 208. By way of example, certain parameters may be tuned and evaluated with a goal to reduce a total time for the benchmarking task, with a goal to reduce a number of resources utilized, or the like. It should be appreciated that the user may also specify desired starting parameters and recommendations may be provided after a number of different iterations.

Embodiments of the present disclosure may be utilized to incorporate one or more features of the benchmarking environment into a resource provider environment, and as a result, incorporate the capabilities of the benchmarking environment into a larger ecosystem. For example, a user may select operation of a number of different hosted and/or distributed services. In order to operate these services effectively for the user's desired purpose, one or more benchmarking operations may be performed, which may determine how many resources the user will need, how to scale resources, how to configuration resources, and/or other information. By incorporating the benchmarking environment, benchmarking may be completed in a more efficient manner because a starting point may be closer to the saturation point, which may reduce a time to complete the process. These time savings may be especially important when a user is benchmarking using a number of different settings, which may each require a separate benchmarking task. Accordingly, systems and methods may be directed toward developing and/or continuously training one or more machine learning systems to provide recommended settings to one or more users for different benchmarking tasks based, at least in part, on information provided by the user.

Figure 3:
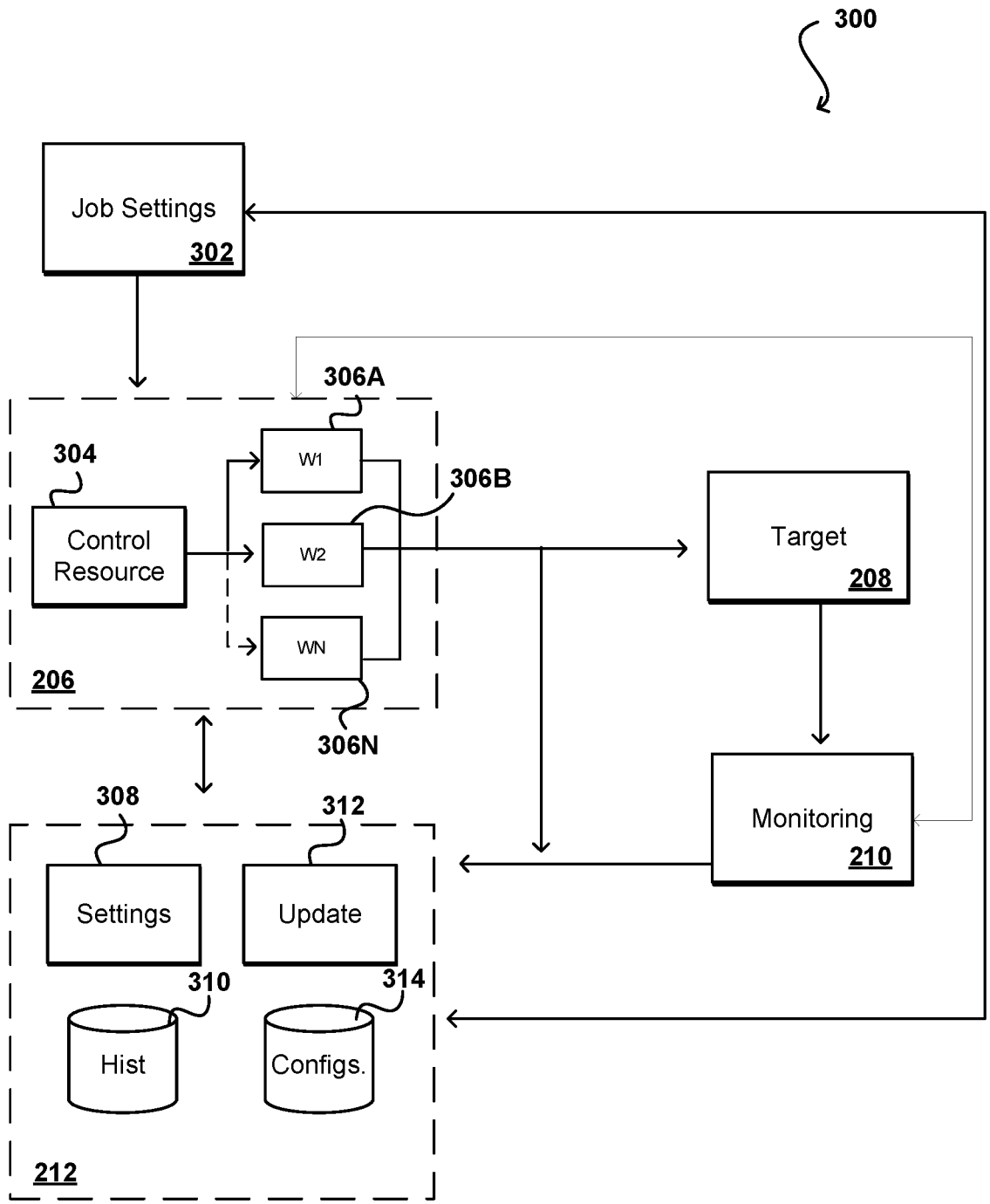
FIG. 3 illustrates an example environment for performing benchmarking that can be utilized in accordance with various embodiments.

FIG. 3 illustrates an example system 300 that can be used to implement aspects of various embodiments. In this example, the system 300 includes at least portions of a benchmarking environment, such as the load generator 206, the target 208, the monitoring subsystem 210, and the learning subsystem 212. Job settings 302 are provided as an input to the load generator 206. As noted herein, the job settings 302 may correspond to one or more configurations associated with different benchmarking operations, which may include at least a desired resource configuration, stop conditions, model artifacts, traffic patterns, and the like. It should be appreciated that various settings may be adjusted and variable such that a plurality of different jobs may be submitted, with each having at least one setting different from at least one other job. In this manner, a user may perform benchmarking for a variety of different configurations that may be encountered during operations.

In various embodiments, the job settings include model artifacts in order to operate one or more machine learning systems that may be hosted within a resource provider environment. The model artifacts may be utilized to initialize the target 208, which may then receive requests from the load generator 206. In this example, the load generator 206 includes a control resource 304 along with a group of worker resources 306A-306N. The number of worker resources 306A-306N may scale or be adjusted according to different operations during benchmarking. For example, a single worker resource 306A may be utilized for a period of time until it is determined that one worker resource 306A is insufficient to saturate the target 210. As a result, an additional worker resource 306B may be brought online to submit requests to the target 208. This process may continue until the target 208 is saturated such that one or more stop conditions are reached. In various embodiments, different settings for the worker resources 306A-306N may be tuned. For example, with respect to a serverless configuration, container settings may be adjusted to adjust a size, a number of simulated users, a number of requests, an instance type, and the like. Additionally, with respect to a server-based configuration, similar settings may also be adjusted for different virtual machines provisioned to execute requests against the target 208.

In operation, the control resource 304 may monitor operation of the worker resources 306A-306N, such as determining an operational utilization, efficiency, power consumption, and the like. The control resource 304 may also transmit information to the monitoring subsystem 210. It should be appreciated that the control resource 304 may also transmit information to the learning subsystem 212. As the benchmarking continues, different worker resources 306A-306N are utilized to saturate the target 208 using a variety of different configurations until the job is complete. In certain embodiments, the load generator 206 and/or one or more resources associated with the load generator 206 are hosted or use up resources that the user pays for, and as a result, reducing an operating time for the benchmarking is desirable to the user.

Systems and methods of the present disclosure may provide initial configuration settings for benchmarking such that a ramp up period is reduced or substantially eliminated. By way of example only, the learning subsystem 212 may determine that, based on the various settings associated with the benchmarking operation, that a certain number of worker resources 306A-306N, a certain configuration of the work resources 306A-306N, or combinations thereof may lead to a faster end of the benchmarking operation, and as a result, configuration settings may be provided to the load generator 206 to initiate the benchmarking operation. This may reduce a ramp up time or may adjust one or more worker resource settings, which may then lead to a faster or more efficient saturation of the target 208, thereby saving the user time and resource use, which may reduce overall costs for the benchmarking.

In this example, the learning subsystem 212 is associated with one or more machine learning systems. These one or more machine learning systems may be trainable systems that may be utilized to select or optimize a set of parameters or configuration settings based, at least in part, on input information associated with the target 208. In various embodiments, the machine learning systems may be trained with reinforcement learning approaches. For example, an agent may take an action within the training environment, where the result of that actin is interpreted as a reward, which is then fed back to the agent for continued learning. In one or more embodiments, the learning may be done to optimize a variety of settings utilized with the load generator based, at least in part, on information associated with the target. For example, one or more actions, such as adjustments to the load generator, may be performed and then the effect on the target may be evaluated and used to adjust later operations. However, it should be appreciated additional techniques, such as supervised learning or unsupervised learning, may also be used. For example, the machine learning systems may be trained on ground truth information that may correspond to different configuration settings for a variety of different target parameters. For example, a target having a certain latency stop condition may be labeled as a ground truth condition where a load configuration has resulted in a stop condition to be reached. Different sets of training data may include similar target parameters where stop conditions were reached with different load configuration settings, and as a result, an optimized set of load configuration settings may be learned based, at least in part, on input information such as target parameters.

As shown in FIG. 3, the learning subsystem 212 includes a settings generator 308. The settings generator 308 may determine the configuration settings for the load generator 206 based, at least in part, on historical benchmarking information, which may be acquired from a data store 310. For example, the settings generator 308 may be associated with one or more machine learning systems that takes, as at least a portion of an input, one or more job settings 302 associated with the benchmarking task. These settings may then be evaluated against other benchmarking operations, or against a learned set of conditions based on the training of the machine learning system, to determine configuration settings, such as determining a number of workers, determining container or resource properties, and the like, which may be provided to the load generator 206 to initiate the benchmarking task. The configuration settings determined by the setting generator 308 may enable a reduction in time to complete the task because ramp up or other tasks may be avoided. In at least one embodiment, the recommended settings are provided to the user and/or the load generator 206 prior to beginning the benchmarking operation, which may reduce an overall time to complete the benchmarking operation.

The illustrated learning subsystem 212 further includes an update module 312 and a configuration data store 314. In at least one embodiment, the update module 312 receives information from the target 208, which may be acquired by the monitoring subsystem 210. This information may be collected continuously or may be collected at predetermined intervals, among other options. The information for current and ongoing jobs may then be used to retrain or otherwise update the settings generator 308, thereby improving recommendations as new information is acquired. For example, the settings generator 308 may provide configuration settings for the load generator 206 and a benchmarking task may begin. The quality of the benchmarking task (e.g., a time to complete the task, a cost of completing the task, resource utilization for the task, etc.) may then be evaluated as information is acquired and provided to the learning subsystem 212. Accordingly, improvements may be identified, such as adjusting how many workers are utilized at a start to further optimize and improve operations. In at least one embodiment, the configuration data store 314 may store or otherwise save configuration settings for various known or common operations, which may reduce a time to receive the configuration settings or may reduce resource utilization. For example, if a user frequently conducts benchmarking as their model is adjusted, the stored settings may be utilized as a baseline or to evaluate newly determined configuration settings.

It should be appreciated that in various embodiments the job settings 302 may be substantially similar to previous settings evaluated by the machine learning system 212 such that a confidence is high enough that a benchmarking task may be skipped. For example, the machine learning system 212 may be trained or otherwise experience a sufficient number of benchmarking tasks with similar or substantially similar configuration settings as the job settings 302 such that it may determine with a confidence value exceeding a threshold the load settings that will lead to target saturation, and as a result, may recommend forgoing the benchmarking task.

Figure 4:
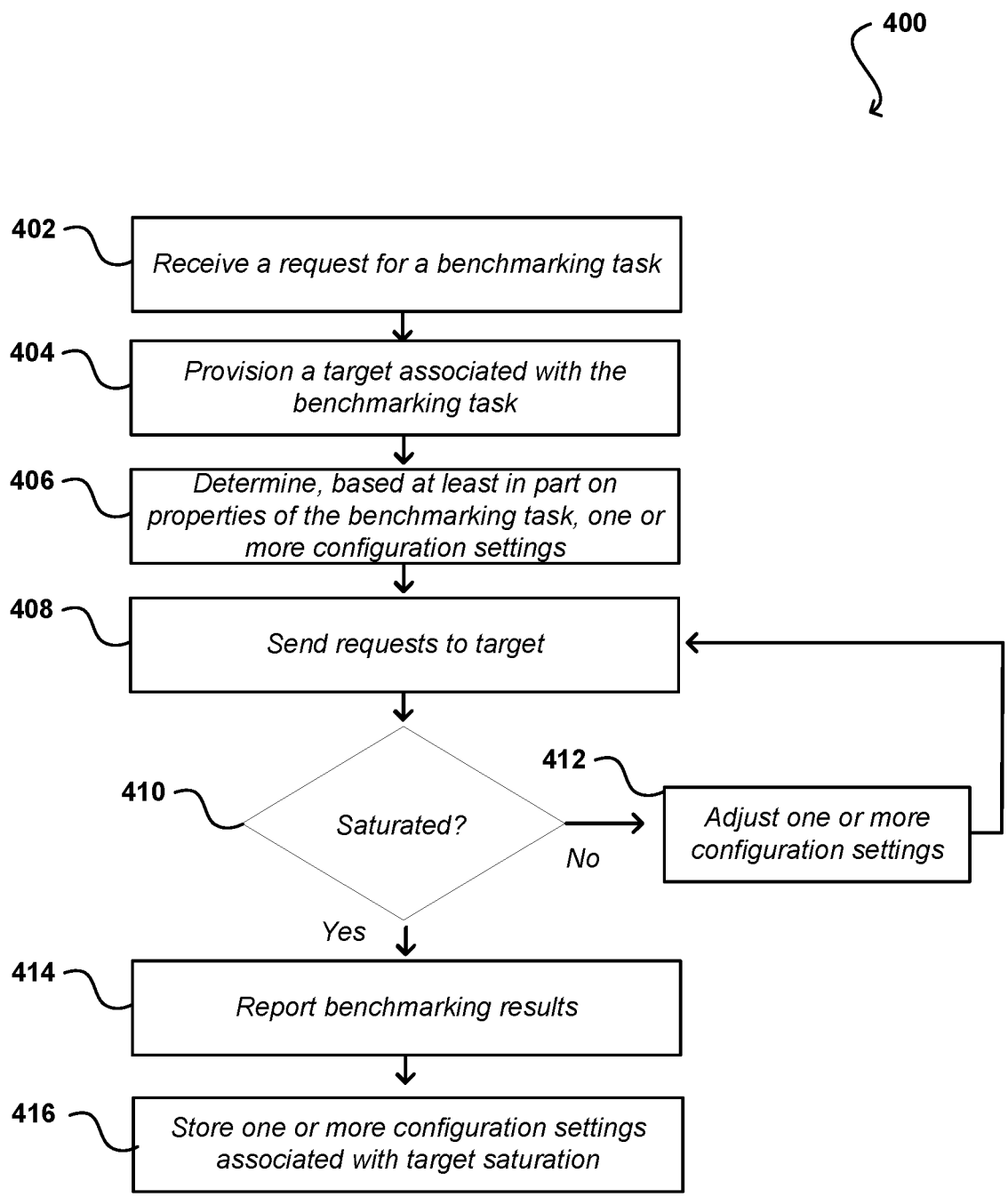
FIG. 4 illustrates an example process for benchmarking using recommended configuration settings that can be utilized in accordance with various embodiments.

FIG. 4 illustrates an example process 400 for performing a benchmarking task that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a request to perform a benchmarking task is received 402. For example, a user may submit a request to perform a benchmarking task, where the request can further include data and/or parameters for the benchmarking task, such as the system to be tested, workload traffic patterns, model artifacts, and the like. A target may be provisioned 404 according to the parameters. For example, the target may include an endpoint that includes one or more parameters associated with the request.

In at least one embodiment, one or more configuration settings for the benchmarking task are determined 406. The configuration settings may include information such as a number of worker resources or requests to submit. Additionally, the configuration settings may include a time period or other information which may affect, at least in part, a duration of the benchmarking task. Requests to the target are sent 408, and the target is evaluated to determine whether it has been saturated 410. If not, then one or more configuration settings may be adjusted 412, such as by adding additional worker resources to make requests. If the target is saturated, benchmarking results may be reported to the user 414 and one or more configuration settings may be stored 416, which may be used to train a machine learning system.

Figure 5:
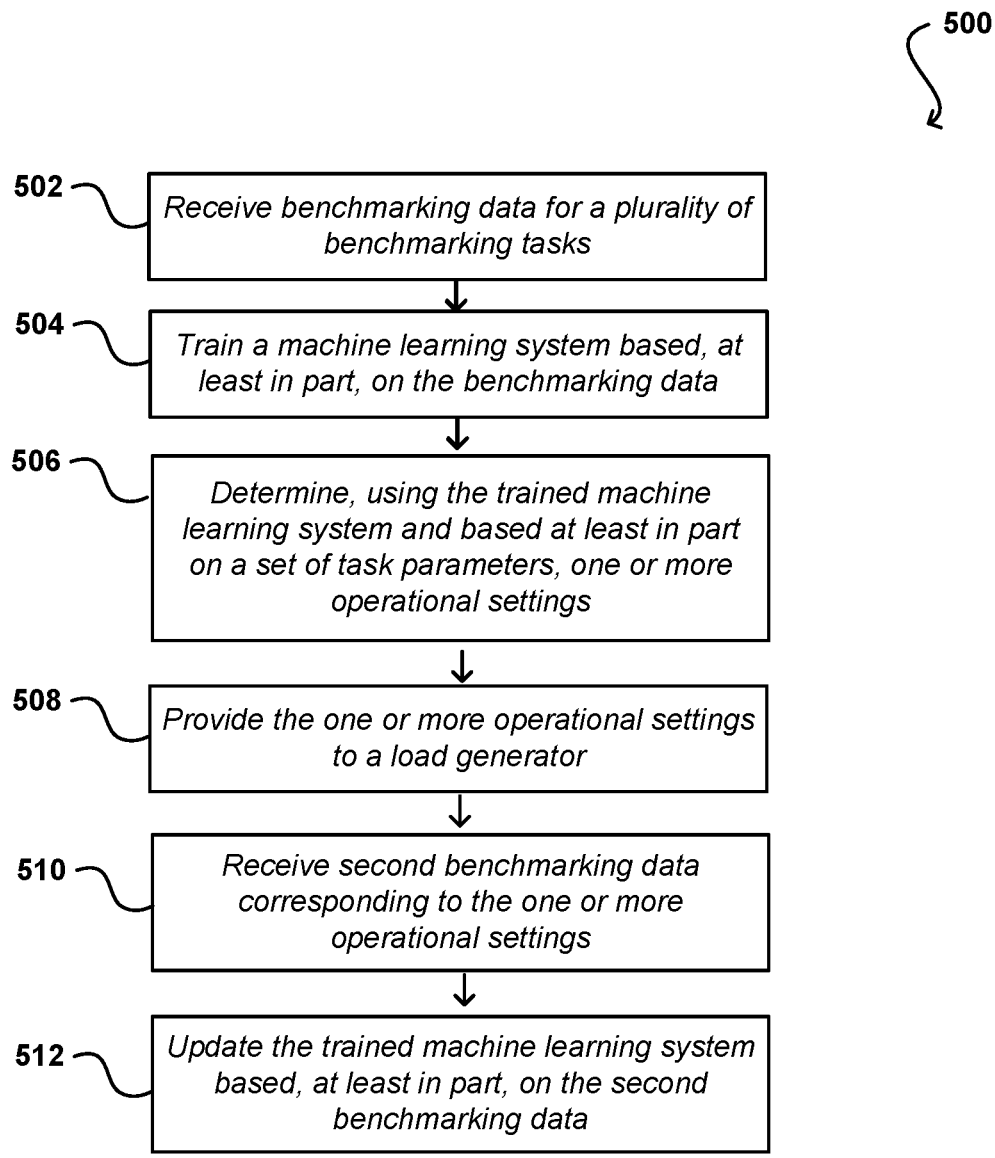
FIG. 5 illustrates an example process for training and using a benchmarking environment that can be utilized in accordance with various embodiments.

FIG. 5 illustrates an example process 500 for training and utilizing a machine learning system for benchmarking tasks. In this example, benchmarking data from a plurality of benchmarking tasks is received 502. The benchmarking data may be collected over a period of time and may include data for a variety of different target configurations and operations, thereby providing a robust dataset for training. In at least one embodiment, the benchmarking data may be categorized and organized based, at least in part, on different features, such as instance type, stop conditions, and the like. A machine learning system may be trained based, at least in part, on the benchmarking data 502. For example, at least a portion of the benchmarking data may serve as ground truth information for training a machine learning model, which may learn through reinforcement learning approaches.

Operational settings for different benchmarking tasks may be determined using the trained machine learning model 506. For example, one or more task parameters may be provided as an input to the machine learning system, to get one or more operational settings for a benchmarking task. The operational settings may be provided to a load generator 508, which may then conduct load testing on a target. Second benchmarking data, such as data associated with the ongoing task, may be collected 510 and used to update the trained machine learning model 512. As a result, the model may continue to improve as different benchmarking tasks are performed using a variety of different parameters.

Figure 6:
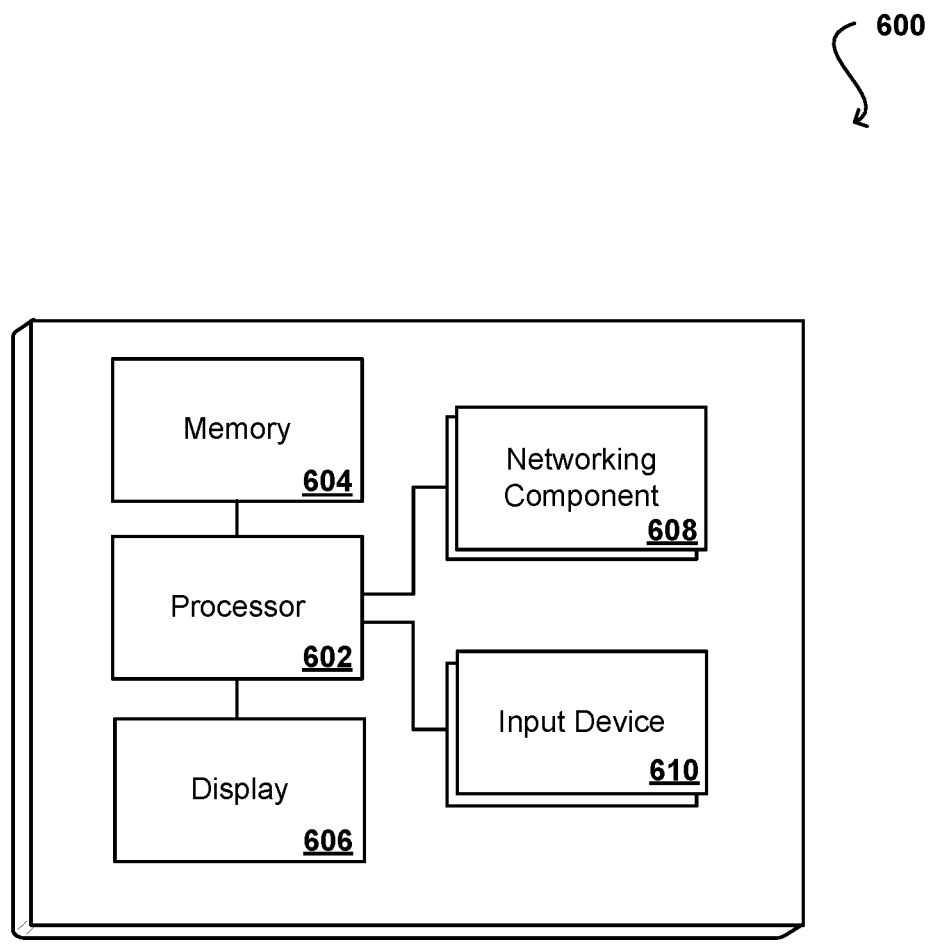
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
provisioning a target associated with a benchmark task, the target configured with one or more properties provided by a user;
determining, by a trained machine learning system based at least in part on the one or more properties, one or more configuration settings for a load generator;
sending a first request to the target using the one or more configuration settings;
determining the target is not saturated by the first request;
determining one or more adjusted configuration settings for the load generator;
sending a second request to the target using the one or more adjusted configuration settings;
determining the target is saturated by the second request; and
storing the one or more adjusted configuration settings.

2. The computer-implemented method of claim 1, wherein the one or more properties include at least one of a system to be load-tested, workload traffic patterns, or stop conditions.

3. The computer-implemented method of claim 1, further comprising:
training the trained machine learning system based, at least in part, on historical benchmarking operations; and
updating the trained machine learning system based, at least in part, on the one or more adjusted configuration settings.

4. The computer-implemented method of claim 3, further comprising:
providing, to the user, benchmarking results associated with one or more parameters that caused a stop condition to occur.

5. The computer-implemented method of claim 1, wherein the load generator includes at least one of a serverless resource or a server-based resource.

6. A computer-implemented method, comprising:
determining, based at least in part on properties for a benchmarking task, operating settings for a load generator;
initializing a control resource and a plurality of worker resources corresponding to the operating settings;
transmitting first requests to a target using at least a portion of the plurality of worker resources;
determining a stop condition is invalid;
generating modified operating settings for the load generator; and
transmitting second requests to the target using the modified operating settings.

7. The computer-implemented method of claim 6, further comprising:
adding additional worker resources to the plurality of worker resources based, at least in part, on one or more utilization metrics of the target.

8. The computer-implemented method of claim 6, further comprising:
determining a stop condition is valid; and
providing, to a user associated with the benchmarking task, benchmarking data for the benchmarking task.

9. The computer-implemented method of claim 6, further comprising:
receiving target performance metrics associated with individual requests.

10. The computer-implemented method of claim 9, wherein the target performance metrics include at least one of latency, CPU utilization, GPU utilization, memory utilization, or network utilization.

11. The computer-implemented method of claim 6, wherein the operating settings correspond to a number and a size of worker resources to begin the benchmarking task.

12. The computer-implemented method of claim 6, wherein the operating settings are determined, at least in part, by a trained machine learning system.

13. The computer-implemented method of claim 12, further comprising:
training the trained machine learning system based, at least in part, on historical benchmarking operations;
receiving a current benchmarking data; and
updating the trained machine learning system based, at least in part, on the current benchmarking data.

14. The computer-implemented method of claim 6, wherein the properties include at least one of a system to be load-tested, workload traffic patterns, or stop conditions.

15. A system, comprising:
at least one processor; and
memory including instructions that, when executed by the at least one processor, cause the system to:
determine, based at least in part on properties for a benchmarking task, operating settings for a load generator;
initialize a control resource and a plurality of worker resources corresponding to the operating settings;
transmit first requests to a target using at least a portion of the plurality of worker resources;
determine a stop condition is invalid;
generate modified operating settings for the load generator; and
transmit second requests to the target using the modified operating settings.

16. The system of claim 15, further comprising instructions that when executed by the at least one processor, further cause the system to:
add additional worker resources to the plurality of worker resources based, at least in part, on one or more utilization metrics of the target.

17. The system of claim 15, wherein the operating settings correspond to a number and a size of worker resources to begin the benchmarking task.

18. The system of claim 15, wherein the properties include at least one of a system to be load-tested, workload traffic patterns, or stop conditions.

19. The system of claim 15, further comprising instructions that when executed by the at least one processor, further cause the system to:
receive target performance metrics associated with individual requests.

20. The system of claim 19, wherein the target performance metrics include at least one of latency, CPU utilization, GPU utilization, memory utilization, or network utilization.

* * * * *